Figure 1:
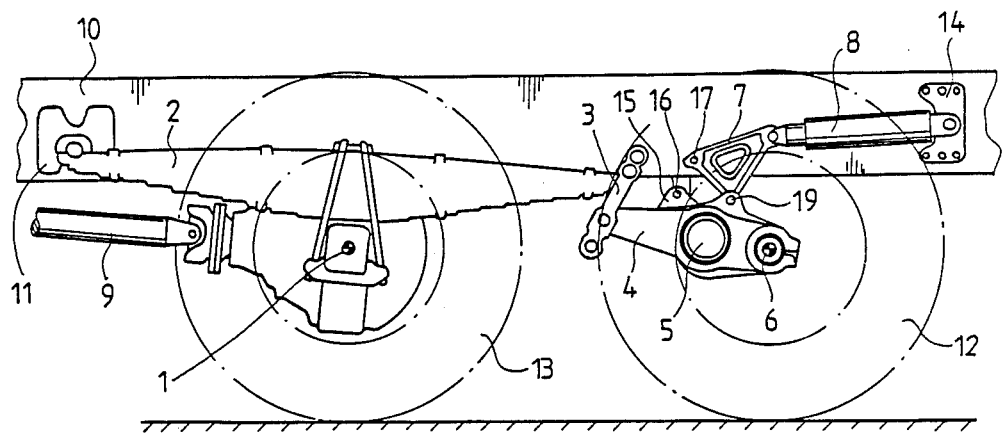

United States Patent [19]

Lauronen et al.

[11] Patent Number: 4,842,302
[45] Date of Patent: Jun. 27, 1989

[54] LIFTING BOGIE FOR A VEHICLE

[75] Inventors: Joel Lauronen, Helsinki; Pentti Kyrölä, Espoo, both of Finland

[73] Assignee: OY Sisu-Auto AB, Karjaa, Finland

[21] Appl. No.: 193,287

[22] PCT Filed: Sep. 23, 1987

[86] PCT No.: PCT/FI87/00127
§ 371 Date: May 2, 1988
§ 102(e) Date: May 2, 1988

[87] PCT Pub. No.: WO88/02314
PCT Pub. Date: Apr. 7, 1988

[30] Foreign Application Priority Data

Sep. 25, 1986 [FI] Finland .................................. 863867

[51] Int. Cl.[4] .............................................. B60C 5/04
[52] U.S. Cl. .................................. 280/704; 180/24.02; 280/718; 280/686
[58] Field of Search ..................... 180/24.02; 280/704, 280/718, 680, 686

[56] References Cited

U.S. PATENT DOCUMENTS 2,777,529 1/1957 Harbers .................. 180/24.02
3,659,671 5/1972 Heinze .................. 180/24.02

Primary Examiner—Kenneth R. Rice
Attorney, Agent, or Firm—Ladas & Parry

[57] ABSTRACT

The invention relates to a lifting bogie for a vehicle, comprising on both sides of the vehicle a rocker arm (4) which is journalled on a shaft (5) and in one end of which an auxiliary shaft (6) is journalled for a bogie wheel (12). When the bogie is lifted by means of a hydraulic cylinder (8) by the action of the transmission lever (7), the rocker arm (4) is pivoted so that the bogie is caused to be lifted up. In order to make the use of the lifting bogie move versatile, the transmission lever (7) is according to the invention connected to the rocker arm (4) by means of a cotter pin (18) also at a point in which the transmission lever (7) is supported on the rocker arm (4) when the bogie is being lifted. The rocker arm (4) can thereby be pivoted by means of the double-acting hydraulic cylinder (8) so that it lifts the driving shaft off the ground by means of a pendant (3) and a bogie spring (2).

4 Claims, 1 Drawing Sheet

LIFTING BOGIE FOR A VEHICLE

This invention relates to a lifting bogie for a commercial vehicle, comprising on both sides of the vehicle a rocker arm journalled on a rocker arm shaft and supported at one end thereof on a bogie spring by means of a spring pendant, and an auxiliary shaft journalled on the rocker arm acentrically with respect to the rocker arm shaft for a bogie wheel, and at least one double-acting hydraulic cylinder for pivoting the rocker arms by means of at least one transmission lever for lifting and lowering the bogie.

Lifting bogie structures of the above type are used very generally in commercial vehicles for improving the ease of movement and the load-carrying capacity of the vehicle, particularly in lorries intended for use also in bad road conditions. As described above, the most usual way of using a lifting bogie is to press the transmission lever by means of the hydraulic cylinder against the rocker arm adjacent to the end thereof close to the spring pendant so that the auxiliary shaft journalled at one end of the rocker arm for the wheel is caused to move upwards. These hydraulic cylinders are often double-acting, so that the transmission lever mounted stationarily therein can be lifted by means of the lifting cylinder so that it does not hinder the movements of the rocker arm. Thus the movement balancing the axle weights of the rocker arm is allowed to take place freely.

The object of the present invention is to provide a lifting bogie structure which enables a more versatile use of a double-acting lifting cylinder, so that the maintenance of the vehicle, e.g. the changing of the tyres, is easier as well as the handling of the vehicle, e.g. when the driving wheels of the vehicle have dug into ground so that the vehicle is stuck.

The above object is achieved by means of a lifting bogie according to the invention, which is characterized in that it comprises means for interconnecting the transmission lever(s) and the rocker arms in order to enable the hydraulic cylinder to exert an upwardly lifting force on the driving shaft by the action of the transmission lever, the spring pendant and the bogie spring. The transmission lever and the rocker arm are preferably interconnected at a point in which the transmission lever is supported on the rocker arm when the bogie is being lifted. It is thereby possible to utilize the traction enabled by the double-acting lifting cylinder for pivoting the rocker arm around the shaft thereof so that the bogie wheel mounted on the auxiliary shaft is pressed against the ground and the bogie spring is lifted upwards by means of the spring pendant with the result that the driving shaft suspended from the bogie spring and the wheels thereof can be lifted off the ground. Thus the wheels of the driving shaft can be changed without any external lifting aid. The vehicle can also be moved even though the driving shaft would be locked or wholly detached. The driving wheels can similarly be lifted up when they have dug into ground so that the vehicle is stuck, whereby the vehicle can again be put into motion by lifting up the driving wheels and reinforcing the ground beneath.

There is preferably one transmission lever provided for each rocker arm, and these levers are triangular and journalled on the rocker arms, whereby it is further to be preferred that the means for interconnecting the transmission lever with the rocker arm comprise a pair of lugs attached to the rocker arm and provided with holes; a hole formed in the transmission lever; and a cotter pin which is arranged to be passed through the lugs of the rocker arm and the holes of the transmission lever. An extremely reliable connection between the transmission lever and the rocker arm can thus be provided by extremely simple means.

Figure 2:
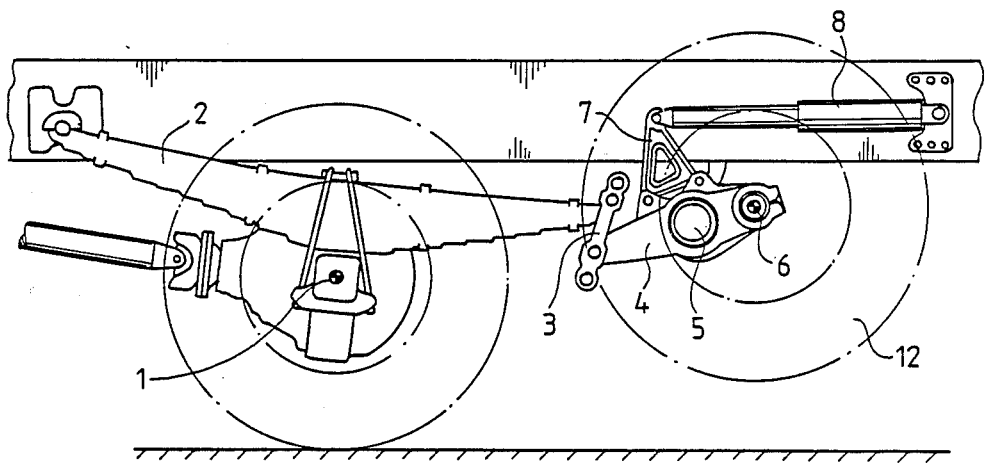
Figure 3:
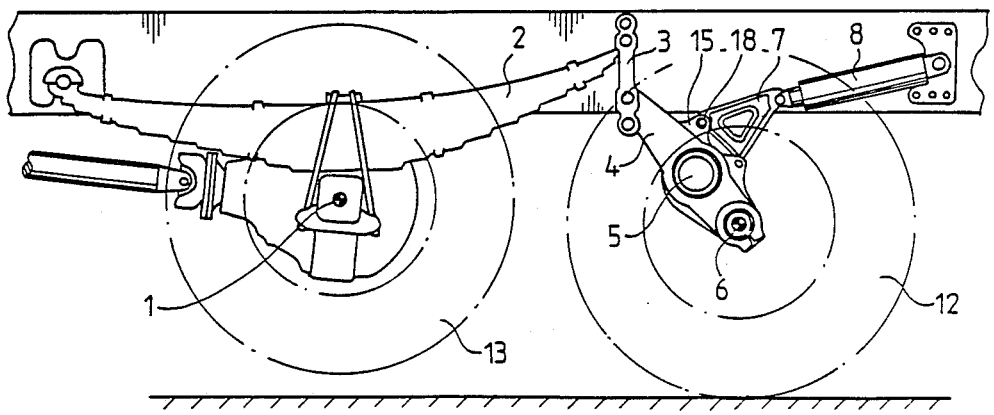

In the following the lifting bogie according to the invention and the operation thereof will be described in more detail with reference to the attached drawing, wherein FIG. 1 illustrates a lifting bogie according to the invention when the bogie is in the lowered position, FIG. 2 illustrates the lifting bogie according to the invention when the bogie is in the lifted position, and FIG. 3 illustrates the lifting bogie according to the invention when a driving shaft is in the lifted position.

The lifting bogie according to the invention shown in FIG. 1 comprises a driving shaft 1 suspended from a bogie spring 2 and wheels 13 attached to the driving shaft and arranged to be operated by means of a drive shaft 9. The bogie spring 2 is at one end thereof attached to a frame 10 of the vehicle by means of conventional fastening means 11. A pendant 3 of a conventional structure is suspended from the other end of the bogie spring 2, and a rocker arm 4 is secured to one end of the pendant 3. The rocker arm 4 is journalled on a rocker arm shaft 5 on which the rocker arms of both sides of the vehicle are generally journalled. It is to be emphasized that, with the exception of the drive shaft 9, the driving shaft 1 and the rocker arm shaft 5, only the structural parts of the lifting bogie positioned on the left side of the vehicle are visible in the figures. The right side of the vehicle is fully symmetrical with that shown in the figures. An auxiliary shaft 6 for a bogie wheel 12 is journalled asymmetrically with respect to the rocker arm shaft 5 at one end of the rocker arm 4. A transmission lever 7 is pivoted on the rocker arm 4 by means of a journal 19 between the shaft 5 and the auxiliary shaft 6. The pivot point could as well be positioned substantially adjacent to the rocker arm shaft 5, as is conventional in lifting bogie structures in which one centrally positioned hydraulic cylinder is used. Furthermore, the pivot point is positioned in front of the rocker arm shaft so that the lifting cylinder can be given a more forward position. The transmission lever 7 is triangular and a hydraulic cylinder 8 is journalled on the point thereof, whereby one end of the hydraulic cylinder 8 is journalled in a supporting lug 14 fastened to the frame 10. In the invention the rocker arm is also provided with two lugs 15 comprising holes 16. These lugs are fitted in the rocker arm 4 at a point in which the transmission lever is supported on the rocker arm when the bogie is being lifted, as shown in FIG. 2. A hole 17 is formed in the transmission lever, so that the transmission lever can be locked in the rocker arm 4 by inserting a cotter pin 18 shown in FIG. 3 through the holes 16 in the lugs 15 of the rocker arm and through the hole 17 of the power transmission lever 7.

FIG. 2 illustrates the operation of the lifting bogie according to the invention when the bogie is in the lifted position. The lifting cylinder 8 is thereby in its extended position, whereby it exerts a force on the rocker arm 4 by the action of the point of the transmission lever 7 provided with the hole 17, and this force pivots the rocker arm around the shaft 5 thereof so that the auxiliary shaft 6 and the bogie wheel 12 attached thereto are lifted up.

FIGS. 1 and 2 illustrate the normal ways of use of the lifting bogie both when the bogie is in the lowered position (FIG. 1) and in the lifted position (FIG. 2). FIG. 3 illustrates a new way of operation to be achieved by means of the lifting bogie according to the invention, whereby the driving shaft 1 and the wheels 13 attached thereto are in the lifted position. The situation of FIG. 3 can be obtained when the hydraulic cylinder 8 is first led in the direction of the lifting of the bogie so that the point of the transmission lever 7 provided with the hole 17 can be place between the lugs 15 of the rocker arm 4 so that the cotter pin 18 can be passed through the holes 16 provided in the lugs 15 and through the hole 17 provided in the transmission lever for connecting the transmission lever 7 stationarily to the rocker arm 4 at this point, too. When the hydraulic cylinder 8 is thereafter brought into a position in which the piston thereof is in the retracted position, the transmission lever 7 exerts a force on the rocker arm 4, which force pivots the rocker arm around the shaft 5 thereof so that the auxiliary shaft 6 and the bogie wheel 12 attached thereto are pressed downwards to be supported on the ground, whereas the other end of the rocker arm, i.e. the end to which the pendant 3 is attached, lifts upwards the end of the bogie spring 2 and, by the action of the bogie spring 2, the driving shaft 1. Thereby the driving shaft 1 and the wheels 13 attached thereto are caused to be lifted off the ground. In this case, the lifting force is not as great as the force exerted during the lifing of the bogie, because the pressure on the piston of the cylinder 8 acts on the side of the piston arm. In practice, this implies that the vehicle has to be without load or loaded as slightly as possible when the driving shaft is to be lifted. Since the springs of the bogie spring, formed by leaf springs, bend in the wrong direction during the lifting and, as a result, the spring constant of the spring is smaller than in normal use, it is not, either, possible to lift the driving shaft as high as the bogie shaft when this is lifted.

The possibility offered by the invention to lift the driving shaft can be utilized in many ways. The driving shaft can be lifted up e.g. for the change of the tyres. Further, the vehicle can be moved even though the driving shaft would be locked or detached, which makes the vehicle easier to handle at a garage, for instance. The possibility to lift the driving shaft also improves the properties of the vehicle in cross-country driving, because when driving in a soft terrain, the driving wheels may dig into ground, whereby it is possible to reinforce the ground beneath by lifting the driving shaft so that the wheels can again get hold of the underlying surface and the driving can be continued.

The lifting bogie according to the invention has been described above only by means of one specific embodiment, so it is to be understood that the invention can be modified widely without, however, deviating from the scope of protection defined in the attached claims. Especially the means essential to the invention, i.e. those by means of which the transmission lever 7 is connected to the rocker arm 4, can be effected in various conventional ways, one of which is the described cotter pin solution, which also can be modified e.g. in such a manner that the lugs are formed in the transmission lever and arranged to be positioned on both sides of a single lug formed in the rocker arm. In addition, the invention can, of course, be applied to a lifting bogie comprising a single transmission lever mounted e.g. on a rocker arm shaft and a centrally positioned hydraulic cylinder acting thereon. The described structure, in which there are two transmission levers journalled on rocker arms, is advantageous over the above-mentioned structure in being shorter as well as more compact.

We claim:

1. A lifting bogie for a commercial vehicle, comprising:
   on both sides of the vehicle a rocker arm journalled on a rocker arm shaft and supported at one end thereof on a bogie spring by means of a spring pendant, and an auxiliary shaft journalled on the rocker arm acentrically with respect to the rocker arm shaft for a bogie wheel,
   at least one double-acting hydraulic cylinder for pivoting the rocker arm by means of at least one transmission lever for lifting and lowering the bogie, and
   means for temporarily interconnecting the transmission lever and the rocker arm when desired so as to enable an upwardly lifting force to be exerted on the driving shaft by means of the hydraulic cylinder by the action of the transmission lever, the spring pendant and the bogie spring.

2. A lifting bogie according to claim 1, wherein the transmission lever and the rocker arm are interconnected at a point in which the transmission lever is supported on the rocker arm when the bogie is being lifted.

3. A lifting bogie according to claim 1, wherein one transmission lever is provided for each rocker arm, said transmission lever is triangular in shape and pivots on the rocker arm.

4. A lifting bogie according to claim 1 wherein said interconnecting means comprise a lug attached to the rocker arm and provided with a first hole; a second hole formed in the transmission lever; and a cotter pin arranged to be passed through the lug of the rocker arm and the first and second holes.

* * * * *